United States Patent
Wang

(10) Patent No.: US 12,225,381 B2
(45) Date of Patent: Feb. 11, 2025

(54) DEVICE BEHAVIOR DETECTION METHOD, BLOCKING PROCESSING METHOD, MEDIUM, AND ELECTRONIC DEVICE

(71) Applicant: TENCENT TECHNOLOGY (SHENZHEN) COMPANY LIMITED, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 995 days.

(21) Appl. No.: 17/034,412

(22) Filed: Sep. 28, 2020

(65) Prior Publication Data

US 2021/0014689 A1    Jan. 14, 2021

Related U.S. Application Data

(63) Continuation of application No. PCT/CN2019/090155, filed on Jun. 5, 2019.

(30) Foreign Application Priority Data

Sep. 21, 2018   (CN) .......................... 201811110283.X

(51) Int. Cl.
   *H04W 12/122*   (2021.01)
   *H04L 9/40*     (2022.01)
   *H04W 76/30*    (2018.01)

(52) U.S. Cl.
   CPC ....... *H04W 12/122* (2021.01); *H04L 63/1416* (2013.01); *H04L 63/1425* (2013.01); *H04W 76/30* (2018.02)

(58) Field of Classification Search
   CPC ... H04W 12/122; H04W 76/30; H04W 12/71; H04W 76/11; H04W 12/12; H04L 63/1416; H04L 63/1425; H04L 63/1441
   See application file for complete search history.

(56) References Cited

U.S. PATENT DOCUMENTS 10,492,071 B1 * 11/2019 Havaralu Rama Chandra Adiga ................. H04W 12/082
11,509,501 B2 * 11/2022 Pallas ................. H04L 12/4641
(Continued)

FOREIGN PATENT DOCUMENTS

CN        102769549 A      11/2012
CN        104410642 A       3/2015
(Continued)

OTHER PUBLICATIONS

The World Intellectual Property Organization (WIPO) International Search Report for PCT/CN2019/090155 Sep. 11, 2019 5 Pages (including translation).

(Continued)

*Primary Examiner* — Christopher A Revak
(74) *Attorney, Agent, or Firm* — ANOVA LAW GROUP PLLC

(57) ABSTRACT

A method for handling rogue devices in a wireless communication network includes: detecting an interactive behavior between a user equipment and a network-side device in the wireless communication network; determining whether the user equipment is a rogue device according to the interactive behavior; and transmitting identification information of the determined rogue device to the network-side device, for the network-side device to perform blocking processing on the rogue device.

20 Claims, 7 Drawing Sheets

(56) References Cited

U.S. PATENT DOCUMENTS

| | | | |
|---|---|---|---|
| 2008/0004949 A1 | 1/2008 | Flake et al. | |
| 2012/0151033 A1 | 6/2012 | Baliga et al. | |
| 2014/0283073 A1* | 9/2014 | Zeng | H04L 63/1408 |
| | | | 726/23 |
| 2016/0192136 A1* | 6/2016 | Pan | H04W 64/006 |
| | | | 455/456.1 |
| 2016/0212099 A1* | 7/2016 | Zou | H04L 63/1408 |
| 2016/0212114 A1 | 7/2016 | Kuroyanagi et al. | |
| 2017/0201432 A1* | 7/2017 | Balakrishnan | H04W 4/50 |
| 2017/0289159 A1* | 10/2017 | Adrangi | H04W 12/06 |
| 2018/0124096 A1 | 5/2018 | Schwartz et al. | |
| 2019/0274089 A1 | 9/2019 | Castmo et al. | |
| 2020/0169878 A1* | 5/2020 | Thomas | H04L 63/0876 |
| 2022/0086645 A1* | 3/2022 | Kaushik | H04W 24/08 |

FOREIGN PATENT DOCUMENTS

| | | |
|---|---|---|
| CN | 105357146 A | 2/2016 |
| CN | 106470421 A | 3/2017 |
| CN | 107707571 A | 2/2018 |
| CN | 107948199 A | 4/2018 |
| CN | 109275145 A | 1/2019 |
| CN | 113396637 A * | 9/2021 ............ H04W 76/27 |
| GB | 2411801 A * | 9/2005 ............ H04L 63/08 |
| WO | 9944381 A1 | 9/1999 |
| WO | WO-2014094489 A1 * | 6/2014 ............ H04W 12/08 |
| WO | 2016172055 A1 | 10/2016 |
| WO | 2016184505 A1 | 11/2016 |
| WO | 2018086963 A1 | 5/2018 |

OTHER PUBLICATIONS

The European Patent Office (EPO) The Partial Supplementary European Search Report for 19863247.3 Sep. 15, 2021 11 Pages.
The State Intellectual Property Office of the People's Republic of China (SIPO) Office Action 1 for 201811110283.X Jan. 27, 2021 13 Pages (including translation).
The European Patent Office (EPO) The Extended European Search Report for 19863247.3 Jan. 10, 2022 13 Pages (including translation).

* cited by examiner

DEVICE BEHAVIOR DETECTION METHOD, BLOCKING PROCESSING METHOD, MEDIUM, AND ELECTRONIC DEVICE

CROSS-REFERENCES TO RELATED APPLICATIONS

This application is a continuation application of PCT Patent Application No. PCT/CN2019/090155, filed on Jun. 5, 2019, which claims priority to Chinese Patent Application No. 201811110283.X, entitled "DEVICE BEHAVIOR DETECTION METHOD, BLOCKING PROCESSING METHOD, MEDIUM, AND ELECTRONIC DEVICE" filed with the China National Intellectual Property Administration on Sep. 21, 2018, the entire contents of both of which are incorporated herein by reference.

FIELD OF THE TECHNOLOGY

The present disclosure relates to the field of communication technologies, and in particular, to a device behavior detection method, a blocking processing method, a medium, and an electronic device.

BACKGROUND OF THE DISCLOSURE

In a wireless communication system (such as a 4G system or a 5G system), it is usually assumed that user equipment (UE) always performs a signaling procedure in accordance with provisions of a communication protocol. However, with the gradual opening of the wireless communication system, rogue devices inevitably occur in the system. Such devices may perform data transmission in violation of the provisions of the communication protocol intentionally, and further, affect normal operation of the entire wireless communication system.

SUMMARY

Embodiments of the present disclosure provide a device behavior detection method, a blocking processing method, a medium, and an electronic device, to at least avoid, to some extent, a rogue device from affecting normal operation of a wireless communication system.

According to an aspect of the embodiments of the present disclosure, a device behavior detection method for a wireless communication network is provided, applied to a detection device, the method including: detecting an interactive behavior between a user equipment and a network-side device in the wireless communication network; determining whether the user equipment is a rogue device according to the interactive behavior; and transmitting identification information of the determined rogue device to the network-side device, for the network-side device to perform blocking processing on the rogue device.

According to an aspect of the embodiments of the present disclosure, a blocking processing method for a wireless communication network is provided, applied to an access network device, the method including: obtaining identification information of a rogue device in a wireless communication network; ignoring, in response to receiving request signaling that is initiated by the rogue device and that is related to access to the wireless communication network, the request signaling; and releasing, in response to detecting that a connection has been established to the rogue device, the connection to the rogue device.

According to an aspect of the embodiments of the present disclosure, a blocking processing method for a wireless communication network is provided, including: obtaining identification information of a rogue device in a wireless communication network; and releasing, in response to detecting that a connection has been established to the rogue device, a non-access stratum connection to the rogue device, and notifying a base station to release a Radio Resource Control (RRC) connection to the rogue device.

According to an aspect of the embodiments of the present disclosure, a non-transitory computer-readable medium is provided, storing a computer program, the computer program, when executed by a processor, implementing the device behavior detection method for a wireless communication network and/or the blocking processing method for the wireless communication network according to the foregoing embodiments.

According to an aspect of the embodiments of the present disclosure, an electronic device is provided, including: one or more processors; and a storage apparatus, configured to store one or more programs, the one or more programs, when executed by the one or more processors, causing the electronic device to implement the device behavior detection method for a wireless communication network and/or the blocking processing method for the wireless communication network according to the foregoing embodiments.

It is to be understood that, the foregoing general descriptions and the following detailed descriptions are merely for exemplary and explanatory purposes and are not intended to limit the present disclosure.

DESCRIPTION OF EMBODIMENTS

Exemplary implementations are now described more comprehensively with reference to the accompanying drawings. However, the examples of implementations may be implemented in multiple forms, and it is not to be understood as being limited to the examples described herein. Conversely, the implementations are provided to make the present disclosure more comprehensive and complete, and comprehensively convey the idea of the examples of the implementations to a person skilled in the art.

In addition, the described characteristics, structures, or features may be combined in one or more embodiments in any appropriate manner. In the following descriptions, a lot of specific details are provided to give a comprehensive understanding of the embodiments of the present disclosure. However, a person of ordinary skill in the art is to be aware that, the technical solutions in the present disclosure may be implemented without one or more of the particular details, or another method, unit, apparatus, or step may be used. In other cases, well-known methods, apparatuses, implementations, or operations are not shown or described in detail, in order not to obscure the aspects of the present disclosure.

The block diagrams shown in the accompany drawings are merely functional entities and do not necessarily correspond to physically independent entities. In other words, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely exemplary descriptions and do not necessarily include all of the content and operations/steps, nor are they necessarily performed in the sequence described. For example, some operations/steps may be further divided, and some operations/steps may be combined or partially combined. Therefore, an actual execution sequence may be changed according to an actual situation.

Figure 1:
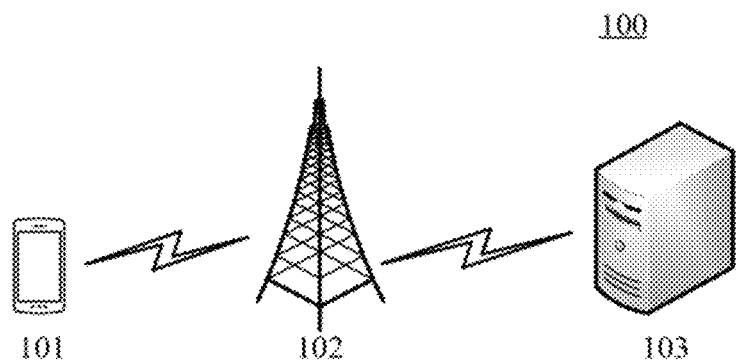
FIG. 1 is a schematic diagram of an exemplary system architecture to which a technical solution according to an embodiment of the present disclosure may be applied.

FIG. 1 is a schematic diagram of an exemplary system architecture 100 to which a technical solution according to an embodiment of the present disclosure may be applied.

As shown in FIG. 1, the system architecture 100 may include user equipment 101, an access network device 102, and a core network device 103. The user equipment 101 may be a smartphone, a tablet computer, a portable computer, a desktop computer, or the like. The access network device 102 may be a base station or the like. The core network device 103 may be a mobility management entity (MME) in a 4G core network or an access and mobility function (AMF) entity in a 5G core network.

It is to be understood that a quantity of the user equipment 101, a quantity of the access network devices 102, and a quantity of the core network devices 103 in FIG. 1 are merely exemplary. There may be any quantity of the user equipment 101, any quantity of the access network devices 102, and any quantity of the core network devices 103 according to implementation requirements.

In an embodiment of the present disclosure, a detection module may be configured (such as configured on the user equipment 101, a network-side device, or an entity other than the network-side device, an entity installed with the detection module or a collective entity each installed with a module having partial detection function or full detection function disclosed in the following embodiments may be referred as a detection device), to detect an interactive behavior between the user equipment 101 and the network-side device (including the access network device 102 and the core network device 103), determine whether the user equipment 101 is a rogue device according to the interactive behavior, and transmit identification information of the determined rogue device to the network-side device (e.g., transmit from the access network device 102 to the core network device 103, or vice versa, or transmit from another network element to the access network device 102 and the core network device 103, the transmission origin depending on where the detection module is installed), for the network-side device to perform blocking processing on the rogue device. The blocking processing may be performed by at least one of the access network device 102 or the core network device 103. For example, when receiving information such as a random access request, an RRC connection request, and a connection establishment completion message that are initiated by the rogue device, the access network device 102 may ignore the information. If the access network device 102 has established a connection to the rogue device, the access network device 102 may release an RRC connection to the rogue device. In another example, after establishing a connection to the rogue device, the core network device 103 may release a non-access stratum (NAS) connection to the rogue device. It may be seen that the technical solution of embodiments of the present disclosure effectively overcomes malicious attacks of the rogue device on the wireless communication system and helps to avoid the rogue device from affecting normal operation of the wireless communication system.

The implementation details of the technical solution of one embodiment of the present disclosure are described in detail in the following. Embodiments of the present disclosure provides a method for handling rogue devices in a wireless communication network. The method for handling rogue devices may include device behavior detection method(s) for identifying a rogue device, and blocking processing method(s) for blocking the identified rogue device.

Figure 2:
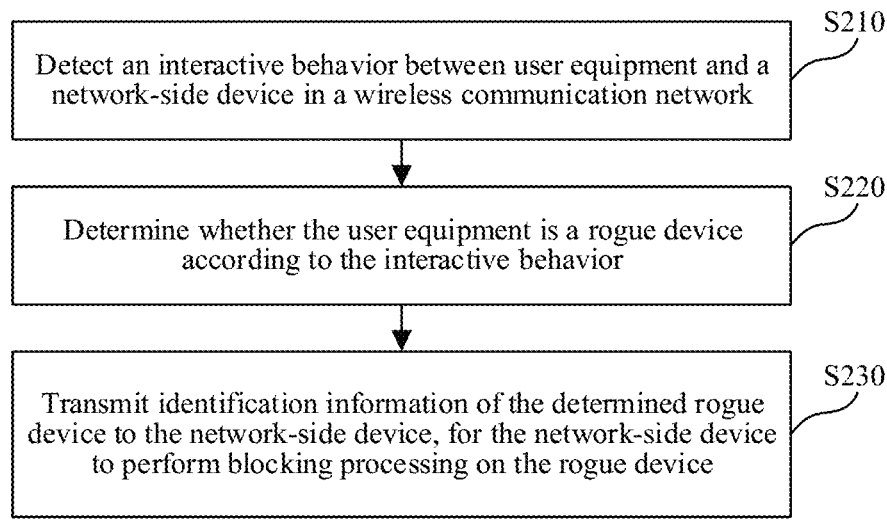
FIG. 2 schematically shows a flowchart of a device behavior detection method for a wireless communication network according to an embodiment of the present disclosure.

FIG. 2 schematically shows a flowchart of a device behavior detection method for a wireless communication network according to an embodiment of the present disclosure. The device behavior detection method may be performed by a detection device (e.g., the detection module). Referring to FIG. 2, the device behavior detection method includes at least steps S210 to S230, and is described below in detail.

In step S210, an interactive behavior between user equipment and a network-side device in a wireless communication network is detected.

In an embodiment of the present disclosure, the interactive behavior between the user equipment and the network-side device includes a control plane protocol behavior and a user plane protocol behavior between the user equipment and the network-side device, and an application layer behavior of the user equipment during interaction with the network-side device.

In an embodiment of the present disclosure, the control plane protocol behavior and the user plane protocol behavior between the user equipment and the network-side device may be detected through a detection module installed on the network-side device. In addition, the application layer behavior may be detected through a detection module installed on the user equipment.

In an embodiment of the present disclosure, the interactive behavior between the user equipment and the network-side device may be detected through an entity other than the network-side device. In this case, the detection module needs to receive the interactive behavior between the user equipment and the network-side device provided by the network-side device. For example, the interactive behavior may include a signaling behavior and a data transmission behavior that are initiated by the user equipment.

Referring still to FIG. 2, in step S220, whether the user equipment is a rogue device is determined according to the interactive behavior.

In an embodiment of the present disclosure, if the detected interactive behavior is the control plane protocol behavior between the user equipment and the network-side device, whether the user equipment is a rogue device may be determined according to the signaling behavior of the user equipment. For example, whether a logic function and/or an execution time sequence of signaling transmitted by the user equipment is abnormal may be determined according to the signaling behavior of the user equipment. If the logic function and/or the execution time sequence of the signaling transmitted by the user equipment is abnormal, the user equipment may be determined as a rogue device.

In an embodiment of the present disclosure, it may be determined that the logic function and/or the execution time sequence of the signaling transmitted by the user equipment is abnormal, when control plane protocol signaling of the user equipment indicates at least one of: the user equipment repeatedly initiating a random access request, the user equipment repeatedly initiating an RRC connection request, and the user equipment repeatedly initiating a connection establishment completion message. The user equipment (UE) repeatedly initiating certain request or message, as used herein, may refer to a number of such initiations made by the UE within a specific time period exceeding a threshold.

In an embodiment of the present disclosure, if the detected interactive behavior is the user plane protocol behavior between the user equipment and the network-side device, whether the user equipment is a rogue device may be determined according to a user plane transmission status and a behavioral characteristic of the user equipment. For example, if user plane transmission of the user equipment is abnormal, and the behavioral characteristic of the user equipment is a predetermined behavioral characteristic (for example, a rogue device characteristic library may be constructed according to predetermined behavioral characteristics), the user equipment is determined as a rogue device.

In an embodiment of the present disclosure, that the user plane transmission is abnormal may be that a user plane transmission exception occurs in a GPRS tunneling protocol (GTP) tunnel of a 5G air interface user plane and a GTP tunnel of a 5G core network user plane. The predetermined behavioral characteristic may be that a Radio Link Control (RLC) layer violates sliding window and sequence number restrictions, or may be an abnormal protocol behavior of a packet data convergence protocol (PDCP) layer. For example, a transmitting end does not start a retransmission mechanism, but a receiving end receives repeated packets or the like one or more times.

In an embodiment of the present disclosure, if the detected interactive behavior is the application layer behavior of the user equipment during interaction with the network-side device, the user equipment is determined as a rogue device if the application layer behavior of the user equipment is a predetermined behavior. For example, a rogue device characteristic library may be constructed according to a rogue behavior of an application layer. The user equipment is determined as a rogue device in response to detecting that the application layer behavior of the user equipment is a behavior in the rogue device characteristic library. In another example, behavioral characteristics of the rogue device may be collected to form training samples of a machine learning model, then the machine learning model is trained through the training samples, and finally, the rogue device may be identified through the trained machine learning model. For example, a behavioral characteristic of to-be-identified user equipment is inputted into the trained machine learning model, then whether the to-be-identified user equipment is a rogue device is determined by using output of the machine learning model. The rogue behavior of the application layer may be an insecure behavior in a specific application program of the user equipment detected through a firewall or anti-virus software or in another method, for example, malicious data theft, violent obtaining of a related permission, and abnormal data transmission.

Referring still to FIG. 2, in step S230, identification information of the determined rogue device is transmitted to the network-side device, for the network-side device to perform blocking processing on the rogue device.

In an embodiment of the present disclosure, a notification message including the identification information of the rogue device may be transmitted to the network-side device, to transmit the identification information of the determined rogue device to the network-side device. The identification information of the rogue device includes a core network identifier of the rogue device and/or an identifier of an air interface used by the rogue device.

In an embodiment of the present disclosure, the core network identifier may be a system architecture evolution-temporary mobile subscriber identity (S-TMSI)/5G-S-TMSI, an international mobile subscriber identity (IMSI), an international mobile equipment identity (IMEI), a mobile station-integrated service digital network (MS-ISDN) number, or the like; and the air interface identifier may be a cell-radio network temporary identifier (C-RNTI) or the like.

In an embodiment of the present disclosure, when the identification information of the determined rogue device is transmitted to the network-side device, identification information of a determined rogue device may be individually transmitted to the network-side device, or identification information of a plurality of determined rogue devices may be transmitted simultaneously to the network-side device.

In an embodiment of the present disclosure, when the identification information of the determined rogue device is transmitted to the network-side device, a quantity of times that each user equipment is determined as a rogue device may be counted, and then, identification information of user equipment that is determined as a rogue device for a specified quantity of times within a predetermined duration is transmitted to the network-side device. In other words, in some possible implementations, the detection module may perform processing after the user equipment is detected as a rogue device for many times, thereby ensuring accuracy of a detection result and avoiding a problem that a rogue device is incorrectly detected due to an accidental factor.

According to the technical solution of the embodiment shown in FIG. 2, in the wireless communication network, a rogue device can be effectively determined based on the interactive behavior between the user equipment and the network-side device, to help the network-side device to perform blocking processing on the rogue device, thereby effectively overcoming malicious attacks of the rogue device on the wireless communication system and helping to avoid the rogue device from affecting normal operation of the wireless communication system.

Figure 3:
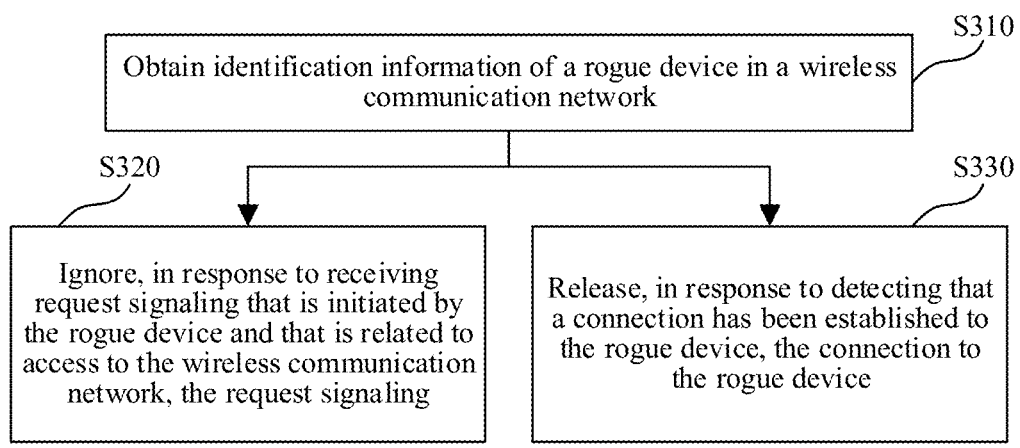
FIG. 3 schematically shows a flowchart of a blocking processing method for a wireless communication network according to an embodiment of the present disclosure.

FIG. 3 schematically shows a flowchart of a blocking processing method for a wireless communication network according to an embodiment of the present disclosure. The blocking processing method may be performed by an access network device. The access network device may be an evolved NodeB (eNB) in a long-term evolution (LTE) network, a gNB in 5G new radio (NR), or an access network element in a future wireless communication network. Referring to FIG. 3, the blocking processing method includes at least steps S310 to S330, and is described below in detail.

In step S310, identification information of a rogue device in a wireless communication network is obtained.

In an embodiment of the present disclosure, the access network device may receive the identification information of the rogue device transmitted by a detection module. In other words, after detecting the rogue device, the detection module transmits the identification information of the rogue device to the access network device. In addition, the access network device may alternatively receive the identification information of the rogue device transmitted by a core network device. For example, after obtaining the identification information of the rogue device detected by the detection module, the core network device may transmit the identification information of the rogue device to the access network device.

In step S320, when request signaling that is initiated by the rogue device and that is related to access to the wireless communication network is received, the request signaling is ignored.

In an embodiment of the present disclosure, the request signaling that is initiated by the rogue device and that is related to access to the wireless communication network includes: a random access request, an RRC connection request, and a connection establishment completion message. Ignoring the request signaling may indicate not responding to the request signaling, for example, not performing resource allocation for the request signaling.

In an embodiment of the present disclosure, if the rogue device initiates the random access request through a dedicated random access preamble and/or a dedicated random access resource, the random access preamble and/or the random access resource may be recovered while ignoring the random access request, to allocate the random access preamble and/or the random access resource to normal user equipment. Therefore, the rogue device is avoided from consuming more radio resources, and utilization efficiency of resources is improved. The random access resource may include a time domain resource and a frequency domain resource.

In step S330, the connection to the rogue device is released in response to detecting that a connection has been established to the rogue device.

In an embodiment of the present disclosure, when the connection to the rogue device is released, an RRC connection between a base station and the rogue device may be released according to the identification information of the rogue device, or may be released according to a release instruction transmitted by a core network device. In other words, when releasing the connection to the rogue device, the access network device may determine by itself to release the RRC connection between the base station and the rogue device according to the identification information of the rogue device, or release the RRC connection according to the release instruction transmitted by the core network device.

According to the technical solution of the embodiment shown in FIG. 3, in the wireless communication network, the access network device can perform blocking processing on a rogue device according to information of the rogue device, thereby effectively overcoming malicious attacks of the rogue device on the wireless communication system and helping to avoid the rogue device from affecting normal operation of the wireless communication system. In addition, the technical solution of the embodiment shown in FIG. 3 is also applicable to other network elements that have interfaces with 4G and 5G network elements, such as a network element supporting edge computing (EC), and an application function (AF) server supporting network capability opening. The technical solution of some embodiments of the present disclosure is also applicable to a terminal-base station integrated node capable of serving another terminal, for example, an integrated access and backhaul (IAB) node introduced to the 5G network.

Figure 4:
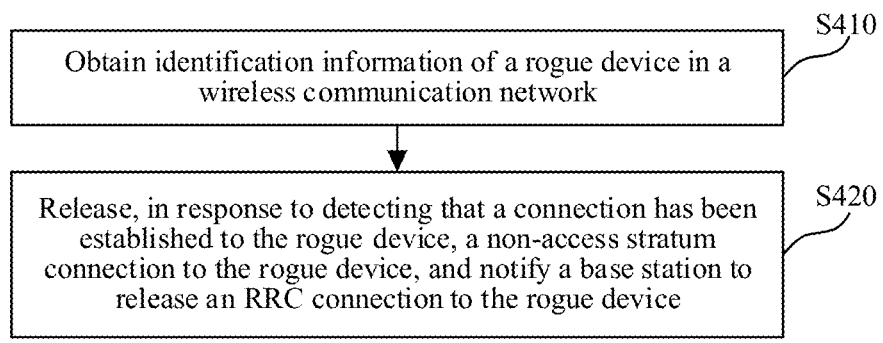
FIG. 4 schematically shows a flowchart of a blocking processing method for a wireless communication network according to an embodiment of the present disclosure.

FIG. 4 schematically shows a flowchart of a blocking processing method for a wireless communication network according to an embodiment of the present disclosure. The blocking processing method may be performed by a core network device (such as an MME or an AMF). Referring to FIG. 4, the blocking processing method includes at least steps S410 to S420 and is described below in detail.

In step S410, identification information of a rogue device in a wireless communication network is obtained.

In an embodiment of the present disclosure, the core network device may receive the identification information of the rogue device transmitted by the detection module. In other words, after detecting the rogue device, the detection module transmits the identification information of the rogue device to the core network device.

In an embodiment of the present disclosure, after obtaining the identification information of the rogue device, the core network device may further transmit the identification information of the rogue device to the base station, for the base station to control an access procedure of the rogue device. For example, when receiving information such as a random access request, an RRC connection request, and a connection establishment completion message that are initiated by the rogue device, the base station may ignore the information.

In step S420, a non-access stratum connection to the rogue device is released in response to detecting that a connection has been established to the rogue device, and a base station is notified to release an RRC connection to the rogue device.

According to the technical solution of the embodiment shown in FIG. 4, in the wireless communication network, the core network device may perform blocking processing on the rogue device according to information of the rogue device, thereby effectively overcoming malicious attacks of the rogue device on the wireless communication system and helping to avoid the rogue device from affecting normal operation of the wireless communication system. In addition, the technical solution of the embodiment shown in FIG. 4 is also applicable to other network elements that have interfaces with 4G and 5G network elements, such as a network element supporting EC, and an AF server supporting network capability opening. The technical solution of some embodiments of the present disclosure is also applicable to the terminal-base station integrated node capable of serving another terminal, such as the IAB node introduced to the 5G network.

Implementation details of the technical solution of one embodiment of the present disclosure are specifically described below with reference to FIG. 5 to FIG. 8.

Figure 5:
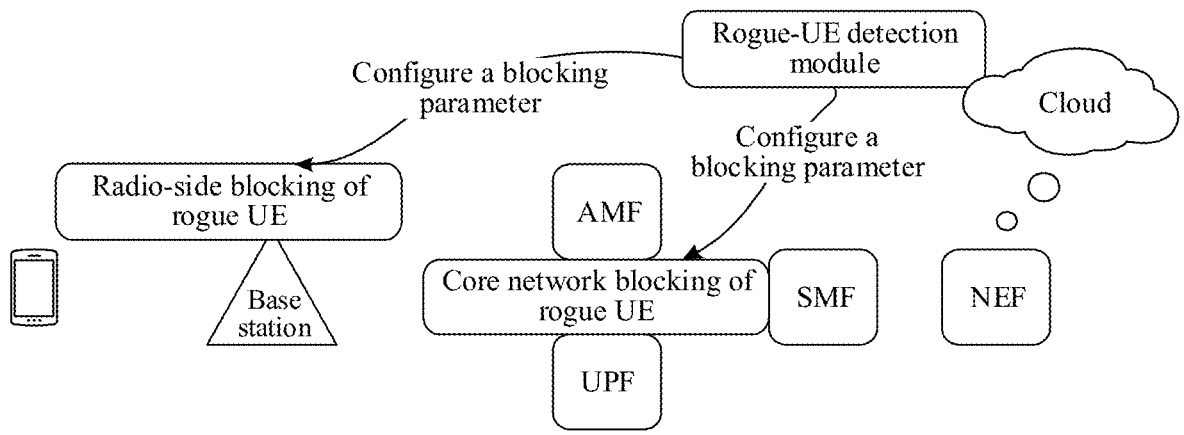
FIG. 5 schematically shows a flowchart of detection and blocking processing on a rogue terminal in a wireless communication network according to an embodiment of the present disclosure.

As shown in FIG. 5, the technical solution of one embodiment of the present disclosure is mainly to change an assumption that a terminal always performs a signaling procedure in accordance with a provision of a communication protocol in the existing 4G and 5G communication standards. When a rogue-UE detection module (for example, a probe installed on a 4G or 5G base station or on a core network element MME/AMF) detects that UE triggers a behavior that violates a protocol procedure, the network-side device can block the UE at different protocol layers, thereby preventing the rogue UE from affecting the wireless communication system. FIG. 5 shows a user port function (UPF), a service management point (SMP), and a network element function (NEF). After detecting rogue UE, the rogue-UE detection module may transmit a blocking parameter including identification information of the rogue UE to a radio-side device (that is, a radio access network-side device), for the base station to perform radio-side blocking. The blocking parameter including the identification information of the rogue UE may also be transmitted to the core network device, for the core network device to perform core network blocking. In addition, the blocking parameter including the identification information of the rogue UE may also be transmitted to a cloud, for a core network element or an access network element to obtain the blocking parameter from the cloud, and to perform blocking processing on the rogue UE according to the blocking parameter. The rogue-UE detection module, the radio-side blocking, and the core network blocking are described below separately.

Processing procedure of the rogue-UE detection module is described below.

In an embodiment of the present disclosure, the rogue-UE detection module may detect a rogue UE according to a control plane protocol behavior, a user plane protocol behavior, and an application layer behavior of the UE.

The control plane protocol behavior includes NAS signaling and RRC signaling, and a signaling behavior based on another interface. Because the 3GPP specifications specify a logic function and an execution time sequence for UE signaling, if signaling transmitted by UE violates a provision, the UE may be determined as a rogue UE. For example, if UE repeatedly initiates a random access request, repeatedly initiates an RRC connection request, or repeatedly initiates a connection establishment completion message, the UE may be determined as a rogue UE. When the control plane protocol behavior of the UE is detected, it may be detected by installing a probe on the base station, the AMF, or another network element. In addition, all UEs or some randomly selected UEs in a network area may be detected, or suspected UE may be selected by the network side and the cloud according to big data analysis.

The user plane protocol behavior includes an access network protocol behavior and a core network protocol behavior. A user plane protocol stack of the access network is a port physical layer (PHY), Media Access Control (MAC), Radio Link Control (RLC), the Packet Data Convergence Protocol (PDCP), or the Service Data Adaptation Protocol (SDAP). In a core network segment, the user plane protocol stack is the L1/L2 Internet Protocol (IP), the User Datagram Protocol (UDP), or the GPRS Tunnel Protocol-User Plane (GTP-U). Any abnormal user plane transmission with a characteristic matching a characteristic of rogue UE may be detected by the detection module.

Detection of the application layer behavior may be performed in the AF, or may be performed by installing an application layer detection module on the terminal.

In an embodiment of the present disclosure, if detection of the rogue UE relies on 4G and 5G access networks and an entity other than the core network element, for example, the AF, the 4G and 5G networks are required to support capability opening, and to provide a corresponding parameter for the AF, for example, signaling and data behavior information of a specific terminal, for the AF to perform detection of a rogue UE according to the parameter.

The above detection may be performed based on a probability. Specifically, because there may be a false positive, UE may not be blocked each time the UE is detected to be rogue. Instead, a threshold may be set. When it is detected for many times that specific UE may be rogue, blocking processing is then performed on the UE.

In an embodiment of the present disclosure, after detecting a rogue UE, the rogue-UE detection module may notify the 4G/5G network to block a batch of terminals such as UEs under one or more cells, or even UEs under one tracking area (TA). Therefore, a new function needs to be added to network elements in the 4G and 5G networks to support releasing the batch of terminals.

In an embodiment of the present disclosure, 4G and 5G network elements need to support a notification or a command of the rogue-UE detection module. A parameter of the command may include, but is not limited to, an identifier of the UE. The identifier of the UE includes any parameter capable of identifying the UE, for example, a core network identifier, an air interface identifier, or an IP address currently allocated to the UE.

Procedure of radio-side blocking is described below.

In an embodiment of the present disclosure, radio-side blocking processing on UE is applicable to a stage in which the UE performs initial access and establishes core network signaling or a data connection, and is also applicable to a stage in which the UE establishes end-to-end signaling or a data connection. The details are described as follows.

1. For UE that performs an initial access, if a rogue attack is detected, for example, the same terminal repeatedly initiates a random access request, the same terminal repeatedly initiates an RRC connection request, or the same terminal repeatedly initiates a connection establishment completion message, the terminal may be determined to be rogue. In this case, the base station may take the following blocking measures for different situations.

If the same terminal repeatedly initiates the random access request, a random access channel (RACH) request message of the terminal may be ignored and not responded to. If dedicated RACH preambles and resources are used when the UE initiates a request, the resources are recovered and allocated to other UEs to prevent the rogue UE from occupying too many resources.

Figure 6:
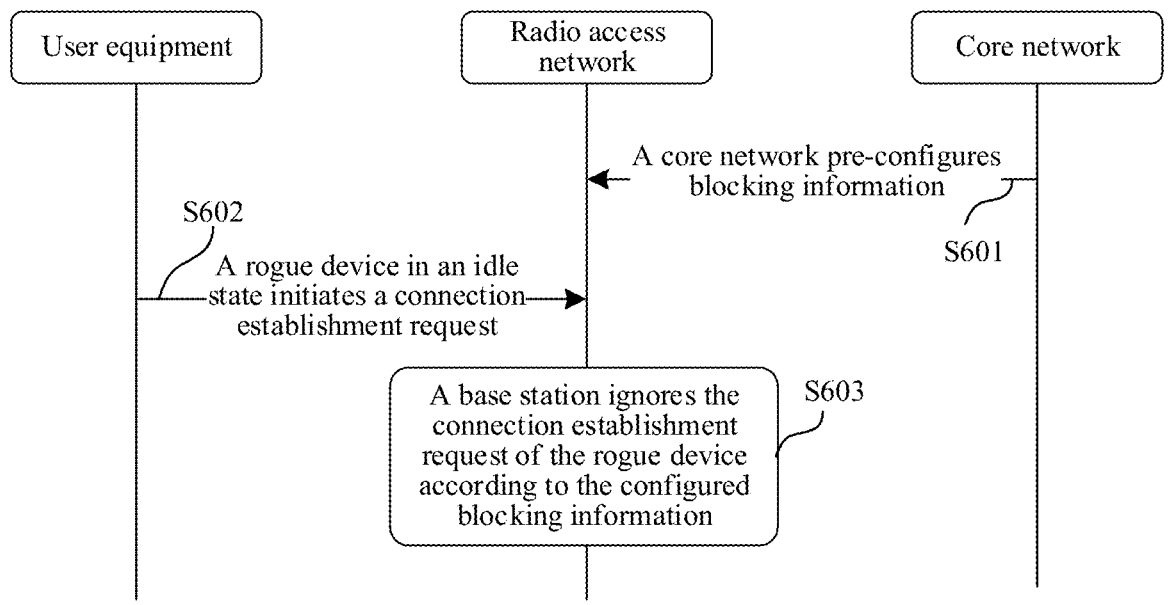
FIG. 6 schematically shows a flowchart of performing blocking processing on a rogue device that initiates a connection request according to an embodiment of the present disclosure.

If the same terminal repeatedly initiates the connection request, the base station may not process the request. In an embodiment of the present disclosure, as shown in FIG. 6, to perform blocking processing on the rogue device that initiates the connection request may include: step S601, a core network pre-configures blocking information to a radio access network; step S602, the radio access network receives a connection establishment request initiated by a rogue device in an idle state; and step S603, a base station ignores a connection establishment request initiated by the rogue device according to the configured blocking information.

If the same terminal repeatedly initiates the connection establishment completion message, the base station may not process the request and may mark the terminal as rogue in the context of the base station side.

2. For UE that has established end-to-end signaling and a data connection, if the UE is determined to be rogue, the base station may release radio-side signaling and a data connection related to the UE.

Figure 7:
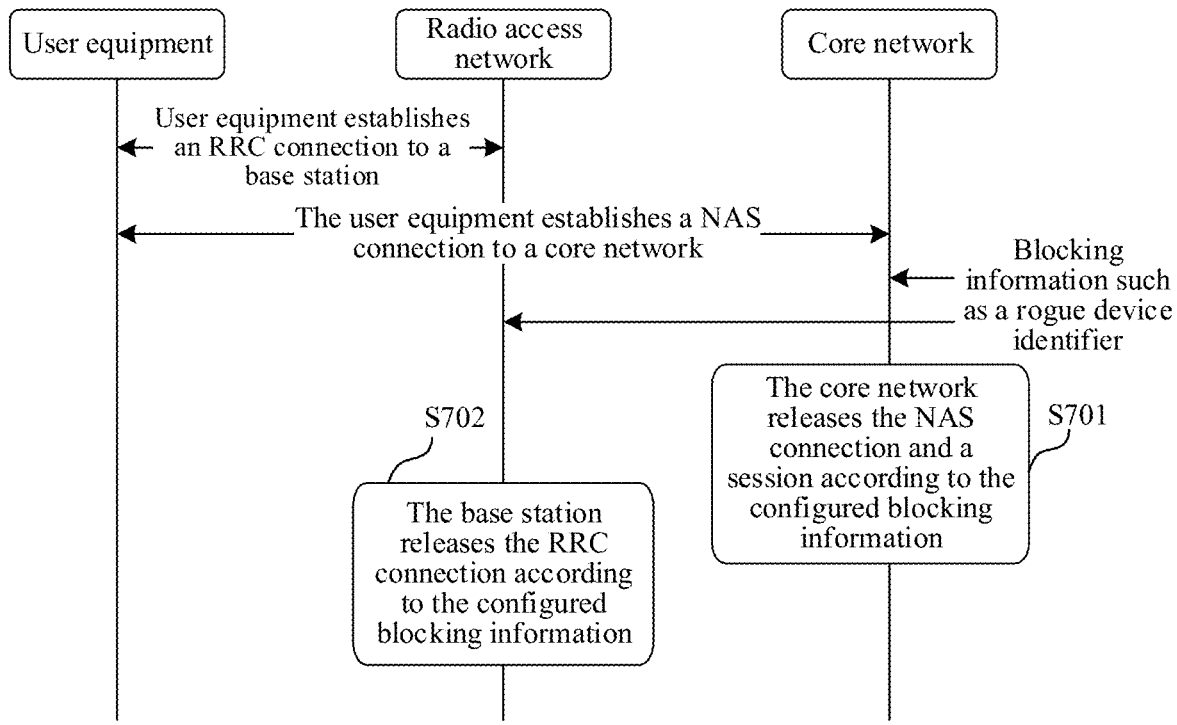
FIG. 7 schematically shows a flowchart of performing blocking processing on a rogue device that has established end-to-end signaling and a data connection according to an embodiment of the present disclosure.

In an embodiment of the present disclosure, as shown in FIG. 7, performing blocking processing on a rogue device that has established end-to-end signaling and a data connection may include: step S701, the core network releases a NAS connection and a session to the rogue device according to the configured blocking information; and step S702, the base station releases an RRC connection to the rogue device according to the configured blocking information. Prior to this, the core network and the radio access network may obtain blocking information such as a rogue device identifier from the cloud, to perform blocking processing according to the blocking information.

In an embodiment of the present disclosure, the base station may collect an attacking time of the rogue UE and identification information of the rogue UE, and report them to the core network device.

Procedure of core network blocking is described below.

In an embodiment of the present disclosure, the core network blocking processing on the UE is applicable to a case in which end-to-end signaling and a data connection has been established. In this case, the core network signaling and the data connection, as well as radio-side signaling and a data connection, need to be removed.

Figure 8:
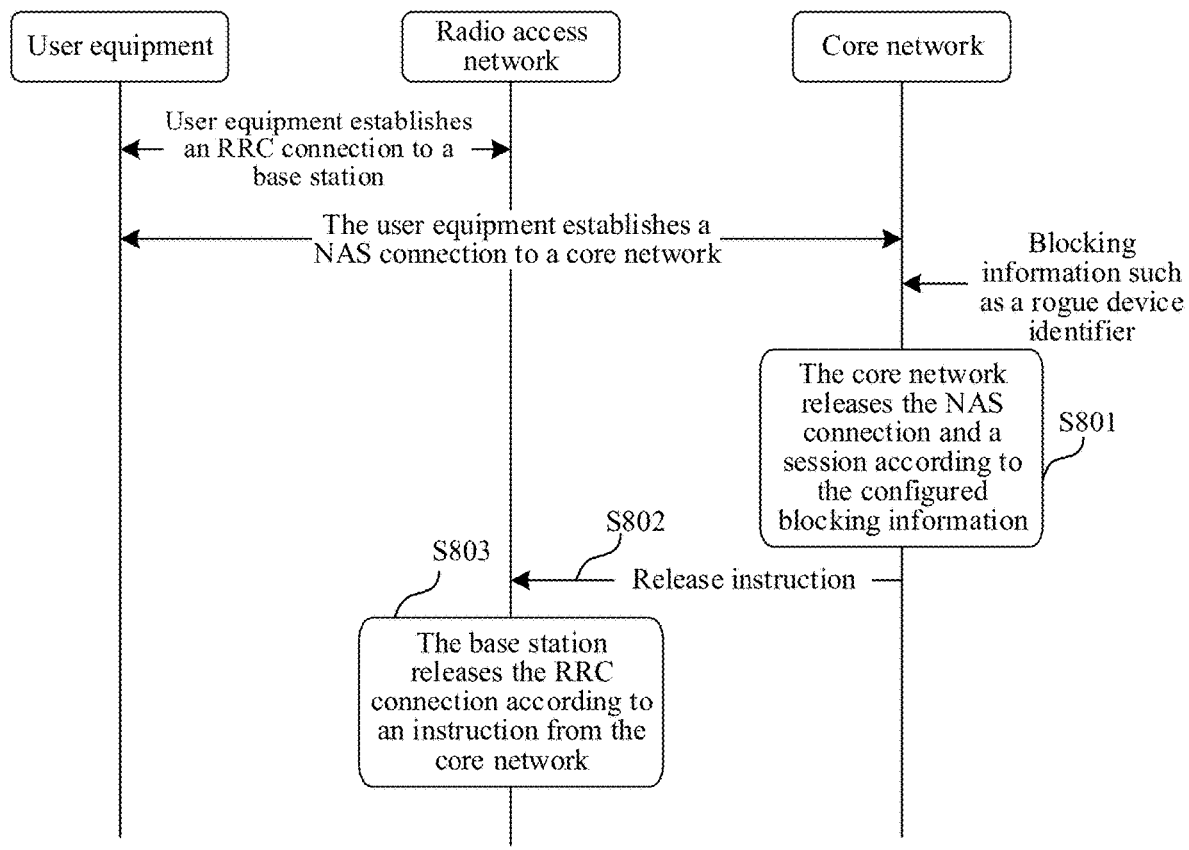
FIG. 8 schematically shows a flowchart of performing blocking processing on a rogue device that has established end-to-end signaling and a data connection according to an embodiment of the present disclosure.

In an embodiment of the present disclosure, as shown in FIG. 8, performing blocking processing on a rogue device that has established end-to-end signaling and a data connection may include: step S801, the core network releases a NAS connection and a session to the rogue device according to configured blocking information; step S802, the core network transmits a release connection instruction to the radio access network; and step S803, the base station releases an RRC connection to the rogue device according to the release connection instruction transmitted by the core network. Prior to this, the core network may obtain blocking information such as a rogue device identifier from the cloud, but the radio access network does not need to obtain the blocking information.

In an embodiment of the present disclosure, after the rogue UE is detected and blocked, the UE may further be prohibited from re-accessing the wireless communication system permanently or within a specified time of a timer. In addition, the network-side device may further broadcast a blocking parameter in system information or configure a blocking parameter for the terminal during an RRC connection release procedure, so that the rogue terminal learns of a specific time during which it cannot access the wireless communication system.

In an embodiment of the present disclosure, the network-side device may further record configuration information of blocking, such as a 5G-S-TMSI allocated to the terminal by a 5G core (5GC) or IMEI information of the terminal, at an access stratum (AS). If AS blocking is ineffective, the terminal may be rejected at the NAS entity (that is, the core network entity such as an MME or an AMF). The terminal may alternatively be rejected at the application layer. If the AF can obtain the identifier of the rogue UE, the AF may provide the identifier of the rogue UE to the core network element, and the core network element may determine whether to prohibit the UE from registering with the wireless communication system again according to the identifier of the rogue UE.

The following describes apparatus embodiments of the present disclosure, and the apparatus embodiments may be used for performing the device behavior detection method for a wireless communication network and the blocking processing method for a wireless communication network in the foregoing embodiments of the present disclosure. For details not disclosed in the apparatus embodiments of the present disclosure, reference may be made to the foregoing method embodiments of the present disclosure.

Figure 9:
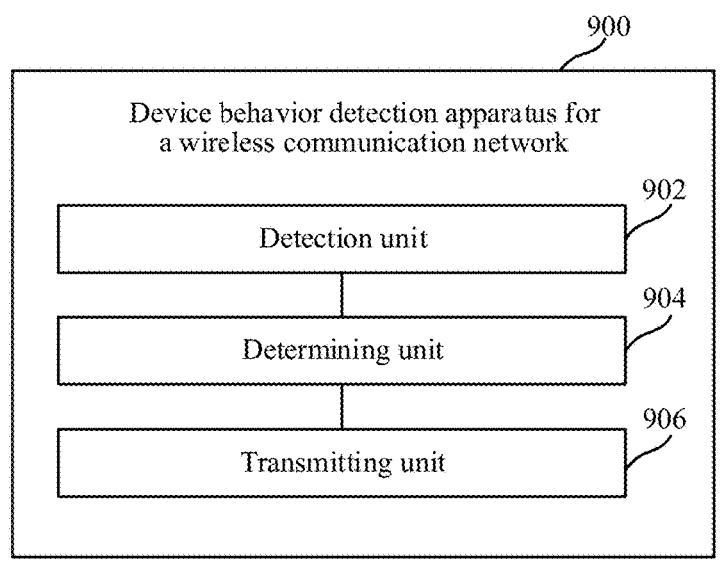
FIG. 9 schematically shows a block diagram of a device behavior detection apparatus for a wireless communication network according to an embodiment of the present disclosure.

FIG. 9 schematically shows a block diagram of a device behavior detection apparatus for a wireless communication network according to an embodiment of the present disclosure.

Referring to FIG. 9, a device behavior detection apparatus 900 for a wireless communication network according to an embodiment of the present disclosure includes: a detection unit 902, a determining unit 904, and a transmitting unit 906.

The detection unit 902 is configured to detect an interactive behavior between user equipment and a network-side device in a wireless communication network. The determining unit 904 is configured to determine whether the user equipment is a rogue device according to the interactive behavior. The transmitting unit 906 is configured to transmit identification information of the determined rogue device to the network-side device, for the network-side device to perform blocking processing on the rogue device.

In an embodiment of the present disclosure, the detection unit 902 is specifically configured to detect a control plane protocol behavior between the user equipment and the network-side device; and the determining unit 904 is specifically configured to determine whether the user equipment is a rogue device according to the control plane protocol behavior of the user equipment.

In an embodiment of the present disclosure, the determining unit 904 is specifically configured to determine whether a logic function and/or an execution time sequence of signaling transmitted by the user equipment is abnormal according to the control plane protocol behavior of the user equipment; and determine that the user equipment is a rogue device when the logic function and/or the execution time sequence of the signaling transmitted by the user equipment is abnormal.

In an embodiment of the present disclosure, the determining unit 904 is specifically configured to determine that the logic function and/or the execution time sequence of the signaling transmitted by the user equipment is abnormal when control plane protocol signaling of the user equipment indicates that a user equipment behavior meets at least one of a plurality of cases, the plurality of cases including that the user equipment repeatedly initiates a random access request, the user equipment repeatedly initiates an RRC connection request, and the user equipment repeatedly initiates a connection establishment completion message.

In an embodiment of the present disclosure, the detection unit 902 is specifically configured to detect the control plane protocol behavior between the user equipment and the network-side device through a detection module installed on the network-side device.

In an embodiment of the present disclosure, the detection unit 902 is specifically configured to detect a user plane protocol behavior between the user equipment and the network-side device; and the determining unit 904 is specifically configured to determine whether the user equipment is a rogue device according to a user plane transmission status of the user equipment and a behavioral characteristic of the user equipment that are represented by the user plane protocol behavior.

In an embodiment of the present disclosure, the determining unit 904 is specifically configured to determine that the user equipment is a rogue device when user plane transmission of the user equipment is abnormal, and the behavioral characteristic of the user equipment is a predetermined behavioral characteristic.

In an embodiment of the present disclosure, the detection unit 902 is specifically configured to detect an application layer behavior of the user equipment during interaction with the network-side device; and the determining unit 904 is specifically configured to determine that the user equipment is a rogue device when the application layer behavior of the user equipment is a predetermined behavior.

In an embodiment of the present disclosure, the detection unit 902 is specifically configured to detect the application layer behavior through a detection module installed on the user equipment.

In an embodiment of the present disclosure, the transmitting unit 906 is specifically configured to count a quantity of times that each user equipment is determined as a rogue device; and transmit identification information of user equipment that is determined as a rogue device for a specified quantity of times within a predetermined duration to the network-side device.

In an embodiment of the present disclosure, the detection unit 902 is specifically configured to receive the interactive behavior between the user equipment and the network-side device provided by the network-side device in the wireless communication network, the interactive behavior including a signaling behavior and a data transmission behavior that are initiated by the user equipment.

In an embodiment of the present disclosure, the transmitting unit 906 is specifically configured to transmit a notification message including the identification information of the rogue device to the network-side device, the identification information of the rogue device including a core network identifier of the rogue device and/or an identifier of an air interface used by the rogue device.

In an embodiment of the present disclosure, the transmitting unit 906 is specifically configured to transmit identification information of a determined rogue device to the network-side device, or to transmit identification information of a plurality of determined rogue devices simultaneously to the network-side device.

Figure 10:
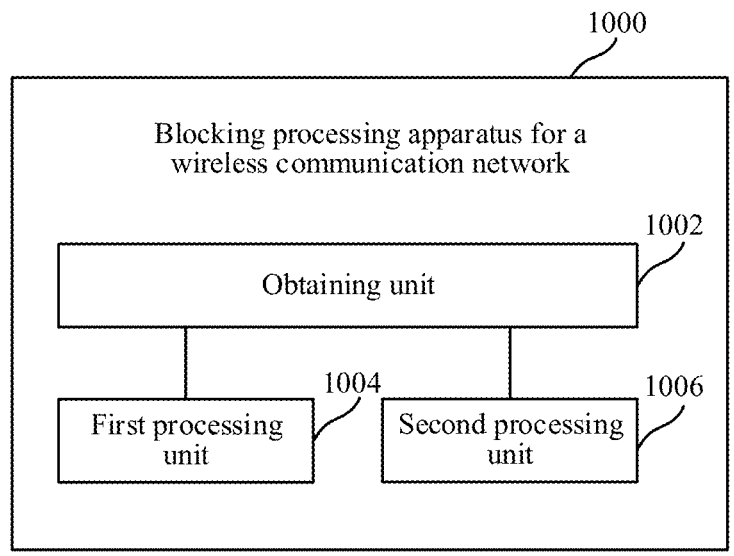
FIG. 10 schematically shows a block diagram of a blocking processing apparatus for a wireless communication network according to an embodiment of the present disclosure.

FIG. 10 schematically shows a block diagram of a blocking processing apparatus for a wireless communication network according to an embodiment of the present disclosure.

Referring to FIG. 10, a blocking processing apparatus 1000 for a wireless communication network according to an embodiment of the present disclosure includes: an obtaining unit 1002, a first processing unit 1004, and a second processing unit 1006.

The obtaining unit 1002 is configured to obtain identification information of a determined rogue device in a wireless communication network. The first processing unit 1004 is configured to ignore, in response to receiving request signaling that is initiated by the rogue device and that is related to access to the wireless communication network, the request signaling. The second processing unit 1006 is configured to release, in response to detecting that a connection has been established to the rogue device, the connection to the rogue device.

In an embodiment of the present disclosure, the request signaling includes: a random access request, an RRC connection request, and a connection establishment completion message.

In an embodiment of the present disclosure, the first processing unit 1004 is further configured to recover, when the rogue device initiates the random access request through a dedicated random access preamble and/or a dedicated random access resource, the random access preamble and/or the random access resource.

In an embodiment of the present disclosure, the second processing unit 1006 is configured to release an RRC connection between a base station and the rogue device according to the identification information of the rogue device; or release an RRC connection between a base station and the rogue device according to a release instruction transmitted by a core network device.

Figure 11:
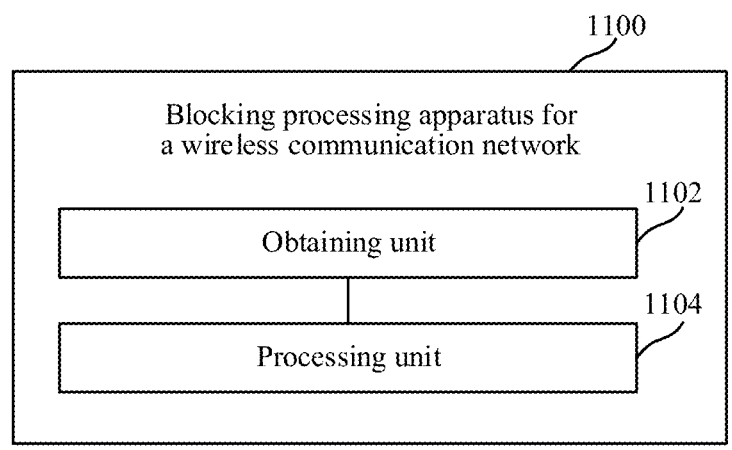
FIG. 11 schematically shows a block diagram of a blocking processing apparatus for a wireless communication network according to an embodiment of the present disclosure.

FIG. 11 schematically shows a block diagram of a blocking processing apparatus for a wireless communication network according to an embodiment of the present disclosure.

Referring to FIG. 11, a blocking processing apparatus 1100 for a wireless communication network according to an embodiment of the present disclosure includes: an obtaining unit 1102 and a processing unit 1104.

The obtaining unit 1102 is configured to obtain identification information of a rogue device in a wireless communication network. The processing unit 1104 is configured to release, in response to detecting that a connection has been established to the rogue device, a non-access stratum connection to the rogue device, and notify a base station to release an RRC connection to the rogue device.

In an embodiment of the present disclosure, the blocking processing apparatus 1100 for a wireless communication network further includes: a transmitting unit, configured to transmit the identification information of the rogue device to the base station, for the base station to control an access procedure of the rogue device.

Figure 12:
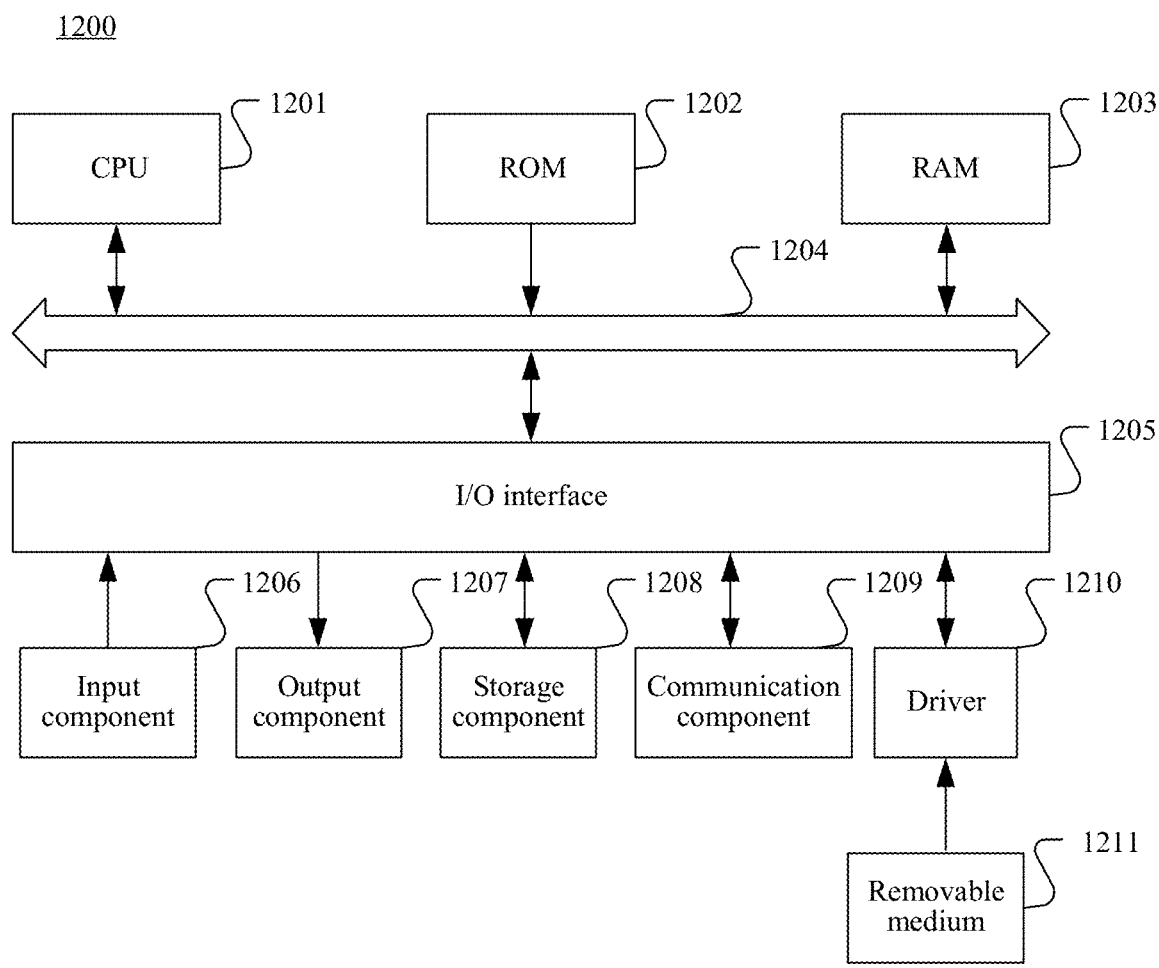
FIG. 12 is a schematic structural diagram of a computer system adapted to implement an electronic device according to an embodiment of the present disclosure.

FIG. 12 is a schematic structural diagram of a computer system adapted to implement an electronic device according to an embodiment of the present disclosure.

A computer system 1200 of the electronic device shown in FIG. 12 is merely an example, and does not constitute any limitation on functions and use ranges of the embodiments of the present disclosure.

As shown in FIG. 12, the computer system 1200 includes a central processing unit (CPU) 1201, which may perform various proper actions and processing based on a program stored in a read-only memory (ROM) 1202 or a program loaded from a storage part 1208 into a random access memory (RAM) 1203. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input component 1206 including a keyboard, a mouse, or the like, an output component 1207 including a cathode ray tube (CRT), a liquid crystal display (LCD), a speaker, or the like, a storage component 1208 including a hard disk, or the like, and a communication component 1209 including a network interface card such as a local area network (LAN) card or a modem. The communication component 1209 performs communication processing through a network such as the Internet. A driver 1210 is also connected to the I/O interface 1205 as required. A removable medium 1211 such as a magnetic disk, an optical disc, a magneto-optical disk, or a semiconductor memory is installed on the driver 1210 as required, so that a computer program read from the removable medium 1211 is installed into the storage component 1208 as required.

Particularly, according to the embodiments of the present disclosure, the processes described below by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed through the communication component 1209 from a network, and/or installed from the removable medium 1211. When the computer program is executed by the central processing unit (CPU) 1201, the various functions defined in the system of the present disclosure are executed.

The computer-readable medium shown in the embodiments of the present disclosure may be a computer-readable signal medium or a computer-readable storage medium or any combination the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal transmitted in a baseband or as part of a carrier, and stores a computer-readable computer program. The propagated data signal may be in a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate or transmit a program for use by or in combination with an instruction execution system, apparatus or a component. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of the present disclosure. In this regard, each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described can also be set in a processor.

According to another aspect, the present disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the present disclosure, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software in combination with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the present disclosure.

After considering the specification and practicing the present disclosure, a person skilled in the art can readily think of other implementations of the present disclosure. The present disclosure is intended to cover any variations, uses or adaptation of the present disclosure following the general principles of the present disclosure, and includes the well-known knowledge and conventional technical means in the art and undisclosed in the present disclosure.

It is to be understood that the present disclosure is not limited to the accurate structures that are described above and that are shown in the accompanying drawings, and modifications and changes may be made without departing from the scope of the present disclosure. The scope of the present disclosure is limited by the appended claims only.

What is claimed is:

1. A method for handling rogue devices in a wireless communication network, applied to a detection device, the method comprising:
   detecting an interactive behavior between a user equipment and a network-side device in the wireless communication network, the network-side device including at least a base station and a core network device, the base station being an access network device corresponding to the user equipment, and the core network device including at least one of device mobility management entity (MME) or an access and mobility function (AMF) entity;
   determining whether the user equipment is a rogue device according to the interactive behavior, comprising:
      determining whether the user equipment has been repeatedly initiating a random access request according to a control plane protocol behavior between the user equipment and the base station;
      determining whether the user equipment has been repeatedly initiating a Radio Resource Control (RRC) connection request according to the control plane protocol behavior;
      determining whether the user equipment has been the user equipment repeatedly initiating a connection establishment completion message according to the control plane protocol behavior; and
      determining that the user equipment is a rogue device when control plane protocol signaling of the user equipment indicates at least one of: the user equipment repeatedly initiating the random access request, the user equipment repeatedly initiating the Radio Resource Control (RRC) connection request, and the user equipment repeatedly initiating the connection establishment completion message; and
   transmitting identification information of the determined rogue device to the network-side device, for the network-side device to perform blocking processing on the rogue device.

2. The method according to claim 1, wherein the detecting an interactive behavior between user equipment and a network-side device in a wireless communication network comprises:
   detecting the control plan protocol behavior between the user equipment and the base station and a control plane protocol behavior between the user equipment and the core network device; and
   the determining whether the user equipment is a rogue device according to the interactive behavior comprises: determining whether the user equipment is a rogue device according to the control plane protocol behavior of the user equipment with at least one of the base station or the core network device.

3. The method according to claim 2, wherein the determining whether the user equipment is a rogue device according to the control plane protocol behavior of the user equipment comprises:
   determining whether a logic function and/or an execution time sequence of signaling transmitted by the user equipment is abnormal according to the control plane protocol behavior of the user equipment; and
   determining that the user equipment is a rogue device when the logic function and/or the execution time sequence of the signaling transmitted by the user equipment is abnormal.

4. The method according to claim 2, wherein the control plane protocol behavior between the user equipment and the base station is detected through a probe installed on the base station; and
   the control plane protocol behavior between the user equipment and the core network device is detected through a probe installed on the MMF or AMF.

5. The method according to claim 1, wherein the detecting an interactive behavior between user equipment and a network-side device in the wireless communication network comprises:
   detecting a user plane protocol behavior between the user equipment and the network-side device; and
   the determining whether the user equipment is a rogue device according to the interactive behavior comprises: determining whether the user equipment is a rogue device according to a user plane transmission status of the user equipment and a behavioral characteristic of the user equipment that are represented by the user plane protocol behavior.

6. The method according to claim 5, wherein the determining whether the user equipment is a rogue device according to a user plane transmission status of the user equipment and a behavioral characteristic of the user equipment that are represented by the user plane protocol behavior comprises:
   determining that the user equipment is a rogue device when user plane transmission of the user equipment is abnormal, and the behavioral characteristic of the user equipment is a predetermined behavioral characteristic.

7. The method according to claim 1, wherein the detecting an interactive behavior between user equipment and a network-side device in a wireless communication network comprises: detecting an application layer behavior of the user equipment during interaction with the network-side device; and
   the determining whether the user equipment is a rogue device according to the interactive behavior comprises: determining that the user equipment is a rogue device when the application layer behavior of the user equipment is a predetermined behavior.

8. The method according to claim 1, wherein the detecting an interactive behavior between user equipment and a network-side device in a wireless communication network comprises:
   receiving the interactive behavior between the user equipment and the network-side device provided by the network-side device in the wireless communication network, the interactive behavior comprising a signaling behavior and a data transmission behavior that are initiated by the user equipment.

9. The method according to claim 1, wherein the transmitting identification information of the determined rogue device to the network-side device comprises:
   counting a quantity of times that each user equipment is determined as a rogue device; and
   transmitting identification information of a user equipment that is determined as a rogue device for a specified quantity of times within a predetermined duration to the network-side device.

10. The method according to claim 1, wherein the transmitting identification information of the determined rogue device to the network-side device comprises:
    transmitting a notification message comprising the identification information of the rogue device to the network-side device, the identification information of the rogue device comprising at least one of a core network identifier of the rogue device or an identifier of an air interface used by the rogue device.

11. The method according to claim 1, wherein the transmitting identification information of the determined rogue device to the network-side device comprises:
  transmitting identification information of one of the determined rogue device to the network-side device, or transmitting identification information of a plurality of the determined rogue devices simultaneously to the network-side device.

12. The method according to claim 1, wherein the blocking processing performed by the network-sided device on the rogue device comprises:
  obtaining by an access network device, the identification information of the rogue device in the wireless communication network;
  ignoring, by the access network device, in response to receiving request signaling that is initiated by the rogue device and that is related to access to the wireless communication network, the request signaling; and
  releasing, by the access network device, in response to detecting that a connection has been established to the rogue device, the connection to the rogue device.

13. The method according to claim 12, wherein the request signaling comprises: a random access request, a Radio Resource Control (RRC) connection request, and a connection establishment completion message.

14. The method according to claim 13, wherein the blocking processing performed by the network-sided device on the rogue device further comprises:
  recovering, by the access network device, when the rogue device initiates the random access request through a dedicated random access preamble and/or a dedicated random access resource, the random access preamble and/or the random access resource.

15. The method according to claim 12, wherein the releasing the connection to the rogue device comprises:
  releasing an RRC connection between a base station and the rogue device according to the identification information of the rogue device; or releasing an RRC connection between a base station and the rogue device according to a release instruction transmitted by a core network device.

16. The method according to claim 1, wherein the blocking processing performed by the network-sided device on the rogue device comprises:
  obtaining, by a core network device, the identification information of the rogue device in the wireless communication network; and
  releasing, by the core network device, in response to detecting that a connection has been established to the rogue device, a non-access stratum connection to the rogue device, and notifying a base station to release a Radio Resource Control (RRC) connection to the rogue device.

17. The method according to claim 16, wherein the blocking processing performed by the network-sided device on the rogue device further comprises:
  transmitting the identification information of the rogue device to the base station, for the base station to control an access procedure of the rogue device.

18. The method according to claim 1, wherein the transmitting identification information of the determined rogue device to the network-side device comprises:
  transmitting the identification information of the determined rogue device to a cloud for the base station and the core network device to obtain the identification information from the cloud.

19. A non-transitory computer-readable medium, storing a computer program, the computer program, when executed by a processor, implementing:
  detecting an interactive behavior between a user equipment and a network-side device in the wireless communication network, the network-side device including at least a base station and a core network device, the base station being an access network device corresponding to the user equipment, and the core network device including at least one of device mobility management entity (MME) or an access and mobility function (AMF) entity;
  determining whether the user equipment is a rogue device according to the interactive behavior, comprising:
    determining whether the user equipment has been repeatedly initiating a random access request according to a control plane protocol behavior between the user equipment and the base station;
    determining whether the user equipment has been repeatedly initiating a Radio Resource Control (RRC) connection request according to the control plane protocol behavior;
    determining whether the user equipment has been the user equipment repeatedly initiating a connection establishment completion message according to the control plane protocol behavior; and
    determining that the user equipment is a rogue device when control plane protocol signaling of the user equipment indicates at least one of: the user equipment repeatedly initiating the random access request, the user equipment repeatedly initiating the Radio Resource Control (RRC) connection request, and the user equipment repeatedly initiating the connection establishment completion message; and
  transmitting identification information of the determined rogue device to the network-side device, for the network-side device to perform blocking processing on the rogue device.

20. An electronic device, comprising:
  one or more processors; and
  a storage medium, configured to store one or more computer programs, the one or more computer programs, when executed by the one or more processors, causing the electronic device to implement:
  detecting an interactive behavior between a user equipment and a network-side device in the wireless communication network, the network-side device including at least a base station and a core network device, the base station being an access network device corresponding to the user equipment, and the core network device including at least one of device mobility management entity (MME) or an access and mobility function (AMF) entity;
  determining whether the user equipment is a rogue device according to the interactive behavior, comprising:
    determining whether the user equipment has been repeatedly initiating a random access request according to a control plane protocol behavior between the user equipment and the base station;
    determining whether the user equipment has been repeatedly initiating a Radio Resource Control (RRC) connection request according to the control plane protocol behavior;
    determining whether the user equipment has been the user equipment repeatedly initiating a connection establishment completion message according to the control plane protocol behavior; and determining that the user equipment is a rogue device when control plane protocol signaling of the user equipment indicates at least one of: the user equipment repeatedly initiating the random access request, the user equipment repeatedly initiating the Radio Resource Control (RRC) connection request, and the user equipment repeatedly initiating the connection establishment completion message; and transmitting identification information of the determined rogue device to the network-side device, for the network-side device to perform blocking processing on the rogue device.

\* \* \* \* \*